US009430490B1

(12) United States Patent
Lewis

(10) Patent No.: US 9,430,490 B1
(45) Date of Patent: Aug. 30, 2016

(54) MULTI-TENANT SECURE DATA DEDUPLICATION USING DATA ASSOCIATION TABLES

(71) Applicant: Formation Data Systems, Inc., Fremont, CA (US)

(72) Inventor: Mark S Lewis, Pleasanton, CA (US)

(73) Assignee: Formation Data Systems, Inc., Fremont, CA (US)

( * ) Notice: Subject to any disclaimer, the term of this patent is extended or adjusted under 35 U.S.C. 154(b) by 88 days.

(21) Appl. No.: 14/229,226

(22) Filed: Mar. 28, 2014

(51) Int. Cl.
*G06F 17/00* (2006.01)
*G06F 17/30* (2006.01)

(52) U.S. Cl.
CPC ................................ *G06F 17/30156* (2013.01)

(58) Field of Classification Search
None
See application file for complete search history.

(56) References Cited

U.S. PATENT DOCUMENTS 7,984,026 B2 * 7/2011 Iitsuka .............. G06F 17/30097 707/692
8,943,024 B1 * 1/2015 Gardner ............ G06F 17/30156 707/640
9,075,532 B1 * 7/2015 Bromley ............... G06F 3/0641
2010/0094817 A1 * 4/2010 Ben-Shaul ............ G06F 3/0608 707/697
2010/0161554 A1 * 6/2010 Datuashvili ....... G06F 17/30156 707/610
2013/0311433 A1 * 11/2013 Gero ................. G06F 17/30156 707/692
2013/0339319 A1 * 12/2013 Woodward ........ G06F 17/30581 707/692
2013/0339848 A1 * 12/2013 Patil .................. G06F 17/30156 715/255
2014/0129830 A1 * 5/2014 Raudaschl .......... G06F 21/6218 713/165
2014/0143213 A1 * 5/2014 Tal .................... G06F 17/30156 707/692
2014/0229936 A1 * 8/2014 Gaonkar ............. G06F 9/45558 718/1
2014/0280198 A1 * 9/2014 Cavage ............. G06F 17/30312 707/741
2015/0039645 A1 * 2/2015 Lewis ............... G06F 17/30156 707/769
2016/0170657 A1 * 6/2016 Suehr ........................ G06F 3/06 711/162

* cited by examiner

*Primary Examiner* — Hung Le
(74) *Attorney, Agent, or Firm* — BL Speer & Associates; Brenda L. Spear

(57) ABSTRACT

A method of providing secure storage and access by authorized users of a multi-tenant data storage system that contains deduplicated data; wherein a unique identifier is assigned to a given data object within a data volume catalog; further wherein the unique identifier includes "ownership" of the data object within the object store itself. Each time a data object is stored by a user, the method of the present invention creates an entry within a data association table of the data storage system, which entry denotes the data volume catalog that has executed the data object write. Using the method of the present invention, only a user of a data volume catalog that has actually "written" the data object will be able to access and read the data object. Thereby the method of the present invention affords data security for a multi-tenant, deduplicated data storage system.

5 Claims, 6 Drawing Sheets

Object Store with
Data Deduplication and
Association table

Fig. 1 – Object Store with Data Deduplication
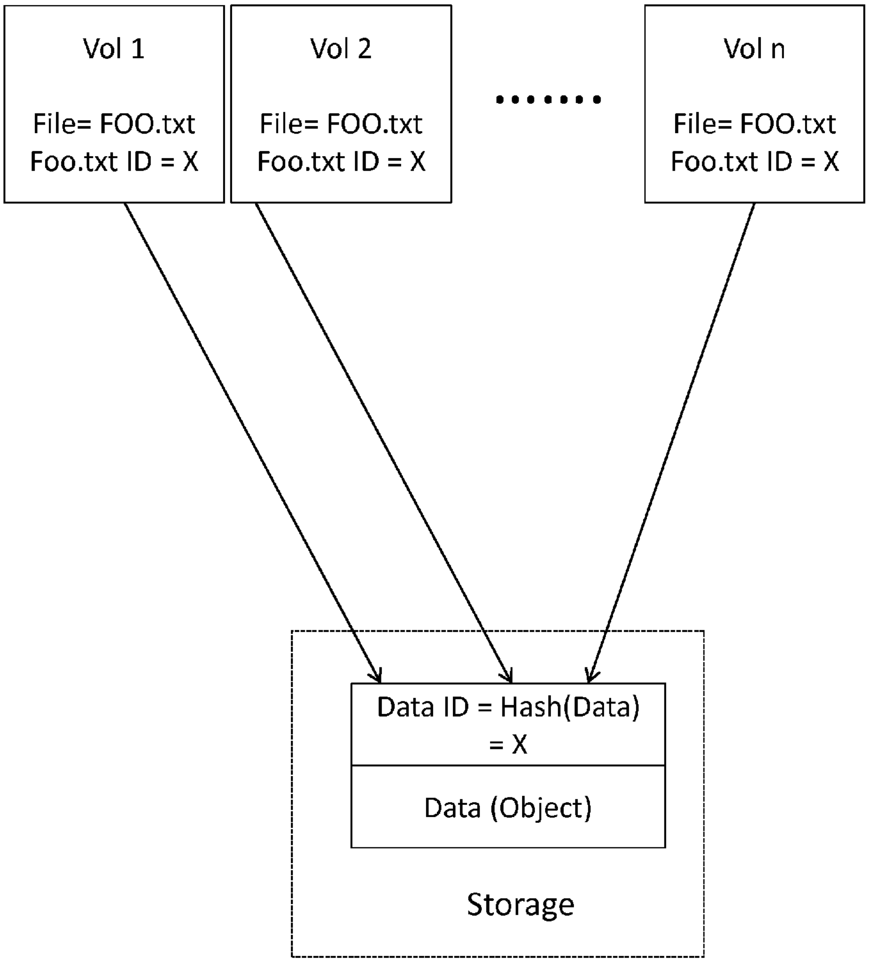

Fig. 2 – Object Store with Data Deduplication and Association table
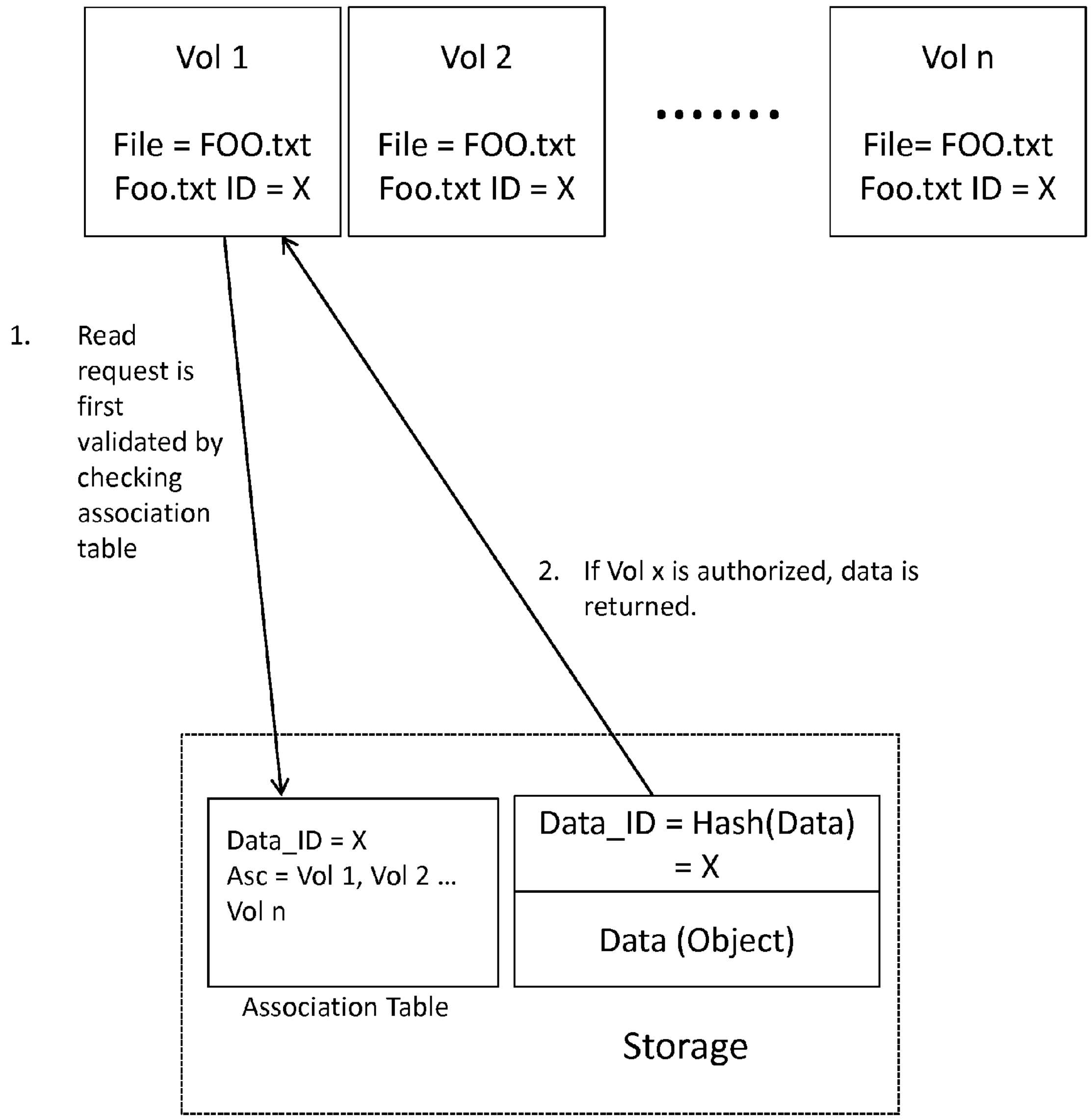

Fig. 3 – Write Data Object Process

Application writes some data to system

10. SH: Create content hash (CH) of DO = > DOID

11. SH: Create Data Object(s) (DO)

12. SH: Send Data Write with DOID & Volume ID (VID) to Applicable SMs

13. SM: Receive data, check if an object already exists.

14. SM: If object exists & an association entry exists for VID: increment the ref_cnt for this volume. Go to Step 17.

15. SM: If object exists but no association entry for the VID: Creates/updates association table entry – minimum information included is:
    DOID, VID, ref_count. Go to Step 17.

16. SM: Write the object to stable storage

17. SM: Confirm the write object to SH.

SM = Storage Manager

SH = Storage Hypervisor

Fig. 4 – Read Data Object Process

Application requests data from system

21. SH: Resolves data request to one or more DOIDs

22. SH: Issues read request (with DOID and VID) to appropriate SM

23. SM: Receives data read request

24. SM: Check DOID and VID for validation in association table

25. SM: If Valid: Data is sent to SH
    If not Valid: Access error is sent to SH SM = Storage Manager SH = Storage Hypervisor

Fig. 5 – Delete Object Process

Application requests to delete an object in a volume:

31. SH: Receive the Delete Object for DOID for VID.
32. SH: Sends a Delete object to the appropriate SMs.
33. SM: Receive the delete object with DOID & VID, check if object exists.
34. SM: If object exists: decrement the ref_cnt for the volume VID requesting delete.
35. SM: If the ref_cnt for this volume is 0, then this volume does not have access.

Application subsequent to delete object above, requests Read for this object in the same volume:

41. SH: Receive the Read object for DOID.
42. SH: Sends the Read object for DOID under volume VID.
43. SM: Receive the read object for DOID under volume VID.
44. SM: Checks to see if there is a association entry for this object with ref_cnt > 1. Since the ref_cnt = 0, rejects this read_object.

SM = Storage Manager

SH = Storage Hypervisor

Fig. 6 – System
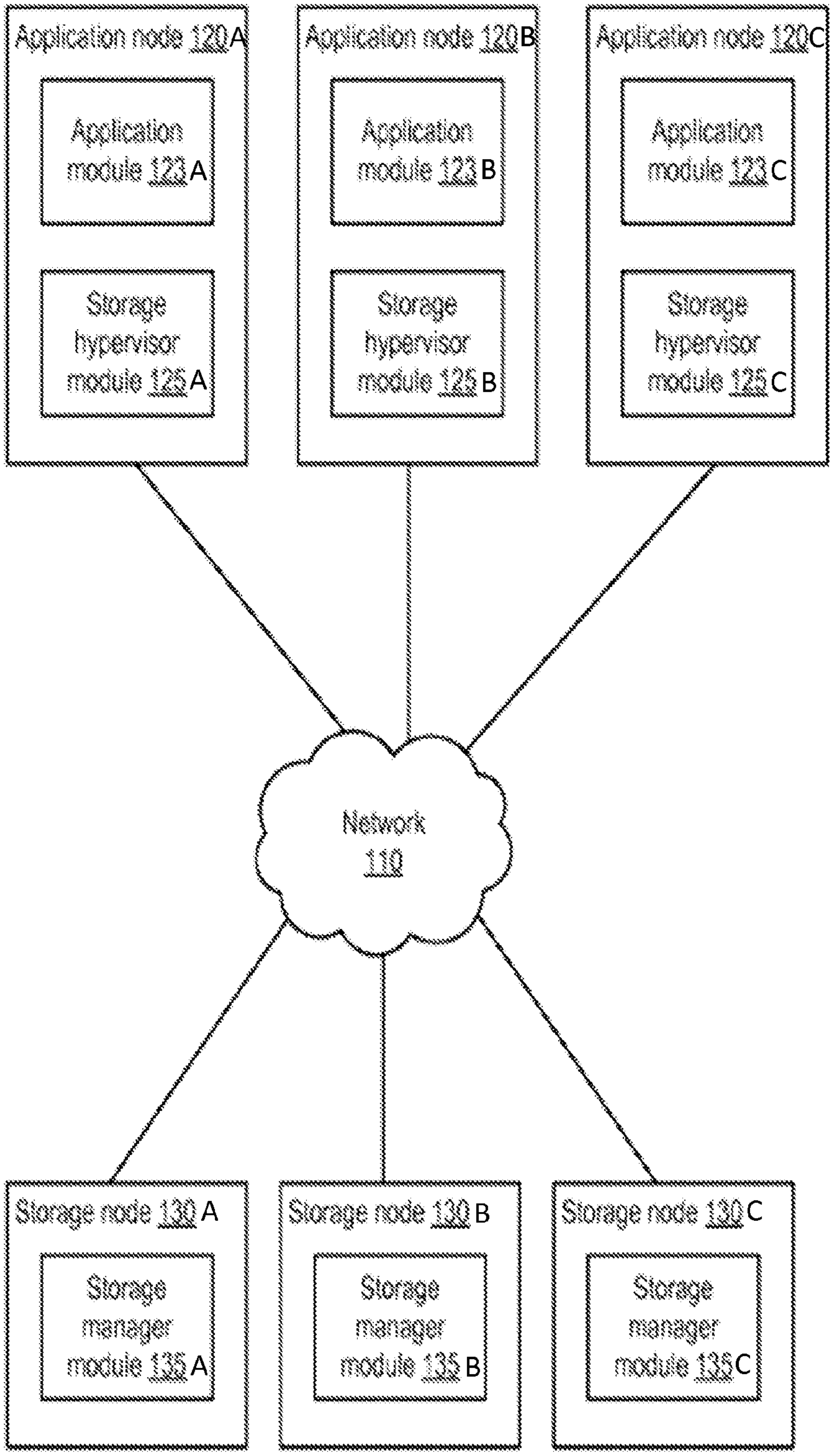

MULTI-TENANT SECURE DATA DEDUPLICATION USING DATA ASSOCIATION TABLES

BACKGROUND OF THE INVENTION

1. Field of the Invention

This invention relates to the areas of data storage, data deduplication and data security; in particular, to a method for multi-tenant, secure, data deduplication using data association tables.

2. Description of Related Art Including Information Disclosed Under 37 CFR 1.97 and 37 CFR 1.98

Much of the data in a data storage system, such as a data storage computer server or servers, is typically data or information that is often duplicated, repetitive or redundant, but which may have different data creators, users, controllers or owners. Examples of such duplicated data are application files, system files, image files, video files and email files. Within an organization or operational unit, these examples of duplicate data tend to have high redundancy levels.

The cost to store electronic data is directly proportional to the amount of data stored. The amount of data stored is amplified, often unnecessarily, by storage of duplicate data. As a result, the size of the data storage systems and the cost of data storage also are increased.

An element of cost containment for a data storage system is the elimination of duplicate data. Additionally, the efficiency of a data storage system is highly dependent on the system's ability to eliminate redundant information and is improved by the elimination of duplicated data. A method to eliminate duplicate data is by painstaking and manual human intervention in the form of identification and elimination of duplicate data prior to placing the data into a data storage system.

Another method to eliminate duplicate data is by automated or computerized reduction of duplicate data by means of hashing data to identify and match identical information or data chunks or sets with a data hash. The data hash serves as a unique identifier for a particular identified and matched data set. Through use of a data hash, only one copy of a particular data set need be associated with the data hash and stored in a data storage system. Although a data hash serves as a unique identifier of a data set, a data hash does not afford secure access to a data set. It is important that in a large data storage system or environment data deduplication to be done in a way such that security of the data is maintained.

Some existing data hash systems try to use obfuscation of a data hash as a means of security for the hashed data set. Use of a data hash may make locating a hashed data set or object within a data storage system more difficult, but is vulnerable to a random data hash request (or obtaining a hashed object identification through another means) that may allow unauthorized access to a hashed data set. In a private or closed data storage system, this may be acceptable. However, in an open or shared data storage system, this lack of data security is not acceptable.

BRIEF SUMMARY OF THE INVENTION

As used herein, an open or shared data storage system is referred to as a multi-tenant data storage system. A tenant or user is a system user with authorized access to particular data in the multi-tenant data storage system. A user may be any user self-identified, cohesive unit, such as an individual, a department within a company, or a company within a conglomerate. The tenants or users in a multi-tenant data storage system may or may not have commonality among each other. Accordingly, in a multi-tenant data storage system, a lack of data security among tenants for each tenant in its particular data is not acceptable, whether or not the data is deduplicated.

There is a need in data storage systems to eliminate duplicate data and to provide secure storage of and access to deduplicated data. The method of the present invention provides a solution that combines and leverages the benefits of data deduplication with protection and access security for the data. The method of the present invention enables tenants or users to share a common "data pool" where duplicated data is eliminated without sacrificing data access security. The method of the present invention provides a unique identifier of a given data object within a data volume catalog; wherein the unique identifier includes "ownership" of the data object within the object store itself.

In accordance with the present invention, a method is provided that allows for secure storage and access by authorized users of a multi-tenant data storage system that contains deduplicated data. The method of the present invention accomplishes this by use of data association tables.

Each time a data object is stored by a user, the method of the present invention creates an entry within a data association table of the data storage system, which entry denotes the data volume catalog that has executed the data object write. Using the method of the present invention, only a user of a data volume catalog that has actually "written" the data object will be able to access and read the data object. Thereby the method of the present invention affords data security for a multi-tenant data storage system.

BRIEF DESCRIPTION OF THE SEVERAL VIEWS OF THE DRAWING(S)

FIG. 1 is a diagrammatic overview of the method of the present invention.

FIG. 2 is a diagrammatic overview of an association table of the method of the present invention.

FIG. 3 is an outline of a write data process of the method of the present invention.

FIG. 4 is an outline of a read data process of the method of the present invention.

FIG. 5 is an outline of a delete data process of the method of the present invention.

FIG. 6 is a diagrammatic overview of a multi-tenant secure data deduplication system using data association tables of the method of the present invention.

DETAILED DESCRIPTION OF THE INVENTION

As used herein, "object store" is understood as follows. An object store raises the level of abstraction presented by block computing devices. Instead of presenting the abstraction of a logical array of unrelated blocks, addressed by their index in the array (i.e., the logical block address), an object store appears as a collection of objects. An individual object is akin to a simple byte stream file, presenting the abstraction of a sparsely allocated array of bytes indexed from zero to infinity.

In an object store computing environment, computing device space is allocated by the storage controller (i.e., the object store itself) and not by overlaying software such as a file system. A user of an object store, e.g., the file system, operates on data by performing operations such as creating an object, reading and/or writing at an offset from the start of the object, and deleting the object. In addition, all operations carry a credential, and it is the responsibility of the object store to validate that the user's request carries a valid credential. This credential allows the storage to enforce different access rights for different portions of a volume of a computing device (i.e., on a per object basis). Further, it eliminates the need to rely on an independently administered physical security, e.g., zoning, masking, etc.

The method of the present invention provides a solution to the need in data storage systems to eliminate duplicate data and to provide secure storage of and access to deduplicated data. The method of the present invention combines and leverages the benefits of data deduplication, while maintaining the protection and access security at least equivalent to a data storage system that segments data by user.

The method of the present invention implements a unique protection method that allows multiple tenants of a data storage system to share a common "data pool" wherein duplicated data is eliminated and data access security is achieved. In accordance with the present invention, a method is provided that allows for secure storage and retrieval by authorized users of a multi-tenant storage system that houses deduplicated data. The method of the present invention uses data association tables to accomplish these objectives.

With reference to FIG. 1, the method of the present invention provides a unique identifier of a given data object [shown as Data ID=Hash(Data)=X, for the Data (Object)] within a volume catalog (shown as Vol 1, Vol 2 and so on through Vol n, depending upon the number of volume catalogs within a system) of the data storage system, which unique identifier includes "ownership" of the data within the object store itself. The uniquely identified Data Object is stored within the Storage system. With the method of the present invention, although every tenant (Vol 1, Vol 2, etc., through Vol n) has access to the data pool (Storage) of the data storage system, the unique identifier of the data object is required for a tenant to retrieve any data or information to which the tenant has authorized or secure access.

A disadvantage of a typical existing shared storage system is that identifiers of a given data object, or object store, can exist unsecured within every volume catalog of the storage system. Accordingly, any user or application with access to the object store would be able to read any information by simply requesting the data identifier (or "Data ID").

Although in a typical existing shared storage system, an ID of a given data object would exist within every volume catalog; however, the "ownership" of the data is not understood within the object store itself. Any user or application with access to the object store would theoretically be able to read any information simply by requesting the Data ID.

The method of the present invention provides both data deduplication and secure data access through the use of data association tables. Each time a data object is stored, the storage system creates an entry within the association table to denote the volume identifier ("Volume ID" or "VID") that has executed the write. Thus, even if a single data object (one that has been deduplicated) is a common file that has been written by many users or applications to a multi-tenant data storage system, the association table entry defines each Volume ID that has "written" the file.

With reference to FIG. 2, any volume that tries to read the data will have its Volume ID checked within the system to insure it has rights access. With the method of the present invention, only a volume that wrote a particular file will be authorized or able to read the file. Accordingly, a volume or user that did not write a file will be denied access to the file. As a result, the method of the present invention enhances security for a multi-tenant object storage system.

With reference to FIG. 6, the multi-tenant secure data deduplication using data association tables method of the present invention consists of data in a shared group of storage nodes, for example 130A, 130B, 130C, used for data storage and retrieval by applications, for example 123A, 123B, 123C, over a network 110. A storage hypervisor ("SH") module, for example 125A, 125B, 125C, serves as a gateway to connect an application to a storage node over the network. Each storage node is managed by a storage manager ("SM") module, for example 135A, 135B, 135C, which manages the data stored.

With reference to FIG. 3, when a data write occurs into the system, first the data is containerized into a data object ("DO") and second a Content Hash ("CH") is determined for each DO. The content hash is a primary part of and is used to create the DO identification, or a "DOID." Third, the DOID and DO are submitted to an appropriate Storage Manager ("SM") for data storage. An assignment of a SM is by a means such that all matching DOs (which also will have matching DOIDs) will be submitted to the same SM.

With reference to FIG. 2 and FIG. 6, once submitted and stored in the SM, the DOID and Volume ID are stored in a database table called an "Association Table." The Association Table tracks all of the Volumes that have written a particular DO. One DO can have any number of Volume ID associations (literally hundreds, thousands or more). The method of the present invention is able to deduplicate or eliminate redundant data, maintain security and achieve the cost-savings of data deduplication with no compromise in security.

With reference to FIG. 4, when a data read from an application occurs, first the requesting DOID and Volume ID are checked in the Association Table within the Storage Manager before any data is returned to the application. If an association of the application to the DOID does not exist, then the storage system returns an error to the application and the DO is not delivered to the application.

With reference to FIG. 5, the method of the present invention ensures data can only be read to a Volume or an Application if the Volume or Application directly wrote the data. If a Volume or an Application deletes a DO, then the association is broken between the Volume or Application and the DO and the Application will no longer be given access to the DO.

The Association Table uses dual parameters of a DOID and Volume ID to verify storage of and access to data by a user or application. The dual parameters of the Association Table afford a secure means for a user or application to access a volume catalog and, therefore, data within the volume catalog.

The method of the present invention comprises writing data to a volume, which volume has a Volume ID; comparing the written data to existing data in the volume; deduplicating the written data within the volume; containerizing the data into a data object; assigning a content hash to the data object and creating a DOID; submitting the DOID and data object to an appropriate Storage Manager for data storage; and storing the DOID and Volume ID in an Association Table.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are described herein.

Although the present invention has been described in considerable detail with reference to specific embodiments or to certain preferred versions thereof, it is understood that modifications and variations of the present invention are possible without departing from the scope of the invention, which is defined by the claims set forth below. Therefore, the spirit and scope of the appended claims should not be limited to the description of the specific embodiments or preferred versions contained herein.

Any element in a claim that does not explicitly state "means for" performing a specified function or "step for" performing a specific function is not to be interpreted as a "means" or "step" clause as specified in 35 U.S.C. §112(f). In particular, the use of "step of" in the claims herein is not intended to invoke the provisions of 35 U.S.C. §112(f).

The invention claimed is:

1. A method for processing a data write request to a multi-tenant secure data deduplication using data association tables system, the method comprising:

a. creating written data by writing data to a volume in a multi-tenant secure data deduplication using data association tables system, further wherein the volume has a volume ID;

b. comparing the written data to existing data in the volume;

c. deduplicating the written data within the volume;

d. containerizing the written data into a data object;

e. creating a direct object identification ("DOID") [DOID] for the data object;

f. submitting the DOID and the data object to a storage manager in the system for data storage; and g. entering the DOID and associated volume ID in an association table in the system.

2. A method of claim 1 further wherein creating a DOID for the data object comprises creating a content hash for the data object and assigning the content hash to the data object.

3. A method for processing a data read request to a multi-tenant secure data deduplication using data association tables system, the method comprising:

a. submitting a data read request for data having a direct object identification ("DOID") [DOID] and an associated volume ID from a storage hypervisor to a storage manager in a multi-tenant secure data deduplication using data association tables system;

b. validating the DOID and associated volume ID of the data read request against an association table in the storage manager; and c. returning either the data of a validated data read request to a storage hypervisor, or an access error of a non-validated data read request to a storage hypervisor;

wherein dual parameters of the DOID and the associated volume ID in the association tables system affords a secure means by which to verify storage of and access to data by a user or an application and data of the data read request can only be read to a volume or an application that directly wrote the data.

4. A method for processing a data delete request to a multi-tenant secure data deduplication using data association tables system, the method comprising:

a. submitting a data delete request for data having a direct object identification ("DOID") [DOID] and an associated volume ID from a storage hypervisor to a storage manager in a multi-tenant secure data deduplication using data association tables system;

b. validating the DOID and associated volume ID of the data delete request against an association table in the storage manager; and c. deleting the volume ID associated with the DOID of a valid data delete request from the association table in the storage manager, or returning an access error of a non-validated data delete request to a storage hypervisor;

wherein dual parameters of the DOID and the associated volume ID in the association tables system affords a secure means by which to verify storage of and access to data by a user or an application and the volume ID associated with the DOID of the data delete request can only be deleted from the association table in the storage manager by a volume or an application that directly wrote the data.

5. A method for processing a write request to a multi-tenant secure data deduplication using data association tables system, the method comprising:

a. creating written data by writing data to a volume in a multi-tenant secure data deduplication using data association tables system, further wherein the volume has a volume ID;

b. comparing the written data to existing data in the volume;

c. deduplicating the written data within the volume;

d. containerizing the written data into a data object;

e. creating a direct object identification ("DOID") [DOID] for the data object; further wherein the DOID is created by creating a content hash for the data object and assigning the content hash to the data object;

f. submitting the DOID and the data object to a storage manager in the system for data storage; and g. entering the DOID and associated volume ID in an association table in the system.

* * * * *